(12) United States Patent
Dourra et al.

(10) Patent No.: US 7,894,965 B2
(45) Date of Patent: Feb. 22, 2011

(54) SWAP SHIFT CONTROL SCHEME FOR AN AUTOMATIC TRANSMISSION

(75) Inventors: Hussein A. Dourra, Bloomfield, MI (US); Ali M. Mourtada, Dearborn Heights, MI (US); David L. Kwapis, Auburn Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 713 days.

(21) Appl. No.: 11/947,506

(22) Filed: Nov. 29, 2007

(65) Prior Publication Data

US 2008/0125267 A1 May 29, 2008

Related U.S. Application Data

(60) Provisional application No. 60/962,615, filed on Nov. 29, 2006.

(51) Int. Cl.
F16H 31/00 (2006.01)
B60K 17/00 (2006.01)

(52) U.S. Cl. ............... 701/58; 701/66; 475/123

(58) Field of Classification Search ............. 701/58, 701/66; 477/123, 125, 127
See application file for complete search history.

(56) References Cited

U.S. PATENT DOCUMENTS

| | | | | |
|---|---|---|---|---|
| 3,589,483 A * | 6/1971 | Smith | ............. | 192/3.52 |
| 4,220,058 A * | 9/1980 | Petzold | ............. | 475/125 |
| 4,875,391 A * | 10/1989 | Leising et al. | ............. | 477/155 |
| 5,099,718 A * | 3/1992 | Asada et al. | ............. | 477/121 |
| 5,109,731 A * | 5/1992 | Iwatsuki et al. | ............. | 477/115 |
| 5,191,814 A * | 3/1993 | Ando et al. | ............. | 477/125 |
| 5,342,258 A * | 8/1994 | Egyed | ............. | 475/281 |
| 5,401,219 A * | 3/1995 | Kimura et al. | ............. | 475/120 |
| 5,689,998 A * | 11/1997 | Lee | ............. | 74/371 |
| 6,093,133 A | 7/2000 | Danielsen et al. | | |
| 6,270,444 B1 * | 8/2001 | Tsutsui et al. | ............. | 477/143 |
| 6,425,841 B1 * | 7/2002 | Haka | ............. | 475/275 |
| 6,467,255 B1 * | 10/2002 | Grob et al. | ............. | 60/274 |
| 6,616,560 B2 * | 9/2003 | Hayabuchi et al. | ............. | 475/116 |
| 6,719,657 B2 * | 4/2004 | Nishida et al. | ............. | 475/65 |
| 6,845,682 B1 * | 1/2005 | Bulgrien | ............. | 74/331 |
| 6,869,382 B2 | 3/2005 | Leising et al. | | |
| 7,128,676 B2 * | 10/2006 | Kinugasa et al. | ............. | 475/5 |
| 7,128,678 B2 * | 10/2006 | Dourra et al. | ............. | 475/123 |
| 7,179,189 B2 * | 2/2007 | Dourra et al. | ............. | 475/123 |
| 7,682,281 B2 * | 3/2010 | Ziemer | ............. | 475/275 |
| 2002/0086756 A1 * | 7/2002 | Park et al. | ............. | 475/73 |

(Continued)

*Primary Examiner*—Mark Hellner
*Assistant Examiner*—Ari M Diacou
(74) *Attorney, Agent, or Firm*—Ralph E. Smith

(57) ABSTRACT

A transmission for a vehicle includes a first gear set and a second gear set. A first plurality of elements are operable in an applied state and a released state and a second plurality of elements are operable in an applied state and a released state. A controller toggles the first and second plurality of elements between the applied state and the released state to achieve a desired gear ratio. The controller times entry of at least one of the first and second plurality of elements into the released state with entry of at least another of the first and second plurality of elements into the applied state by controlling a hold pressure applied to the at least one element entering the released state. The controller determines the hold pressure by referencing current operating conditions of the transmission in a lookup table stored in a memory of the controller.

19 Claims, 8 Drawing Sheets

U.S. PATENT DOCUMENTS

| | | | |
|---|---|---|---|
| 2005/0032603 A1* | 2/2005 | Bulgrien | 475/302 |
| 2005/0137043 A1* | 6/2005 | Kinugasa et al. | 475/5 |
| 2006/0135316 A1* | 6/2006 | Fujii et al. | 477/156 |
| 2006/0142106 A1* | 6/2006 | Dourra et al. | 475/116 |
| 2006/0272436 A1* | 12/2006 | Lein et al. | 74/335 |
| 2008/0176700 A1* | 7/2008 | Long et al. | 475/116 |

* cited by examiner

|      |       | CLUTCHES APPLIED |   |   |   |   |     |   |       |
| GEAR | RATIO | A | B | C | D | E | F   | G | H     |
|------|-------|---|---|---|---|---|-----|---|-------|
| 1    | 3.904 | X |   |   |   | X | (X) |   | $X_f$ |
| 2    | 2.688 | X |   |   |   | X |     | X |       |
| 3    | 2.161 | X |   |   | X |   | X   |   | $X_f$ |
| 4'   | 1.488 | X |   |   | X |   |     | X |       |
| 4    | 1.374 | X | X |   |   |   |     | X | $X_f$ |
| 5    | 0.946 | X | X |   |   |   |     | X |       |
| 6    | 0.652 |   | X |   | X |   |     | X |       |
| R    | 3.042 |   |   | X |   | X | X   |   |       |

Fig-2

SWAP SHIFT CONTROL SCHEME FOR AN AUTOMATIC TRANSMISSION

CROSS-REFERENCE TO RELATED APPLICATIONS

This application claims the benefit of U.S. Provisional Application No. 60/962,615, filed on Nov. 29, 2006. The disclosure of the above application is incorporated herein by reference.

FIELD

The present invention relates to transmission control and more particularly to a swap shift control scheme for a transmission.

BACKGROUND

Generally, conventional automatic transmissions include a torque converter to transfer engine torque from an engine to an input of the transmission, planetary gearsets that provide various gear ratios of torque and thus various drive speeds, and fluid pressure-operated, multi-plate drive or brake clutches and/or brake bands that are connected to the individual elements of the planetary gearsets in order to allow shifts between the various gear ratios In addition, some conventional automatic transmissions include one-way clutches (i.e., overrunning clutches) that cooperate with the multi-plate clutches to optimize power shift control and a transmission controller that selectively applies and releases elements to shift the gears. For example, the controller chooses the proper gear depending on system conditions such as the shift-program selected by the driver (i.e., Drive, Reverse, Neutral, etc.), the accelerator position, the engine condition, and/or the vehicle speed.

As an accelerator is further depressed, and the vehicle increases speed, the controller disengages appropriate clutches to sequentially shift up through each of the gears until the highest gear is engaged. Specifically, the controller initiates a "single swap" event that releases an engaged clutch and applies an idle clutch such that a shift from a lower gear to a higher gear is accomplished. Application and release of the clutches are controlled and timed such that a driver does not feel the gear shift.

Once the highest gear is engaged, further depression of the accelerator causes the controller to perform another single swap event such that a lower gear is chosen, and a requisite torque is supplied by the transmission. The controller will downshift through the gears, each time applying and releasing a single pair of clutches to perform the requisite gear shift.

Thus, conventional transmissions only use a single applying clutch and a single releasing clutch for each individual shift event. Conventional transmissions do not use a "double swap" event involving more than two clutches to achieve a desired gear ratio. Therefore, while conventional transmissions adequately accomplish gear shifts that meet driving conditions through use of "single swap" events, some conventional transmissions, depending on the gear set arrangements, suffer from the disadvantage of not being able to use desirable and available gear ratios, as the exchange of clutches required to achieve the desired ratio involves more than two clutches. The transmission controls, thus, do not utilize all available gear ratios and thereby limit the driveability, performance and fuel economy of the transmission.

SUMMARY

A transmission for a vehicle includes a first gear set including a first plurality of gears and a second gear set including a second plurality of gears. A first plurality of elements are operable in an applied state to selectively engage selected ones of the first plurality of gears and operable in a released state to selectively disengage selected ones of the first plurality of gears. A second plurality of elements are operable in an applied state to selectively engage selected ones of the second plurality of gears and operable in a released state to selectively disengage selected ones of the second plurality of gears. A controller is in communication with the first plurality of elements and the second plurality of elements and toggles the first plurality of elements between the applied state and the released state and toggles the second plurality of elements between the applied state and the released state to provide the transmission with a desired gear ratio. The controller times entry of at least one of the first plurality of elements and the second plurality of elements into the released state with entry of at least another of the first plurality of elements and the second plurality of elements into the applied state by controlling a hold pressure applied to the at least one element entering the released state. The controller determines the hold pressure by referencing current operating conditions of the transmission in a lookup table stored in a memory of the controller.

In another configuration, a transmission for a vehicle includes a first plurality of gears and a second gear set including a second plurality of gears. A first plurality of elements are operable in an applied state to selectively engage selected ones of the first plurality of gears and operable in a released state to selectively disengage selected ones of the first plurality of gears. A second plurality of elements are operable in an applied state to selectively engage selected ones of the second plurality of gears and operable in a released state to selectively disengage selected ones of the second plurality of gears. A controller is in communication with the first plurality of elements and the second plurality of elements and toggles the first plurality of elements between the applied state and the released state and toggles the second plurality of elements between the applied state and the released state to provide the transmission with a desired gear ratio. The controller times entry of at least one of the first plurality of elements and the second plurality of elements into the released state with entry of at least another of the first plurality of elements and the second plurality of elements into the applied state by adaptively regulating a hold pressure applied to the at least one element entering the released state based on previous shift events.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table showing gear ratio combinations and shift sequences for the transmission of FIG. 1;

DETAILED DESCRIPTION

Figure 1:
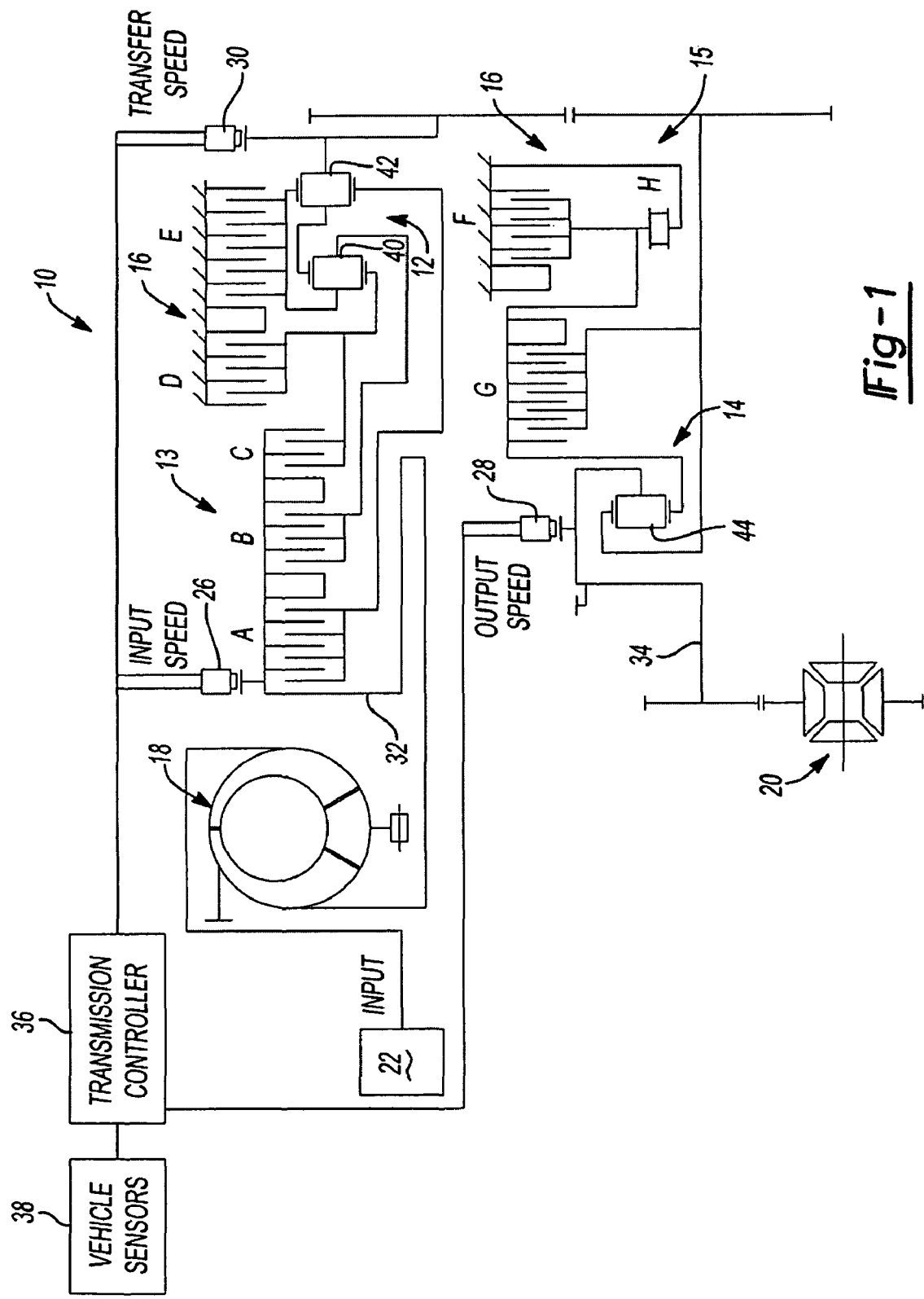
FIG. 1 is a schematic representation of a transmission in accordance with the principals of the present invention.

The following description of the preferred embodiments is merely exemplary in nature and is in no way intended to limit the invention, its application, or uses.

With reference to the figures, a transmission 10 is shown having a main box gear set 12 disposed in a main box 13 of the transmission 10, a underdrive assembly gear set 14 disposed in an underdrive assembly 15 of the transmission 10, and a series of engagement elements 16. The engagement elements 16 selectively engage respective gears of the main box gear set 12 and underdrive assembly gear set 14 to provide the transmission 10 with an optimum gear ratio. As will be described in greater detail below, a solenoid duty cycle of an element of the engagement elements 16 is proportional to the corresponding capacity of the particular element. As such, solenoid duty cycle and torque capacity curves can be used interchangeably.

With particular reference to FIG. 1, the transmission 10 is shown connected to a torque converter 18 and a differential 20. The torque converter 18 is a fluid coupling disposed between a power plant 22, such as, but not limited to, a combustion engine and the transmission 10 and serves to transmit a rotational force from the power plant 22 to the transmission 10. The rotational force received from the power plant 22 via torque converter 18 is then used to drive a combination of the main box gear set 12 and/or underdrive assembly gear set 14 to provide a desired output of the transmission 10. The output of the transmission 10 is received by the differential 20 for use in driving one or more wheels of a vehicle (not shown) at a desired acceleration and speed. The transmission is preferably of the type disclosed in assignee's commonly owned U.S. Pat. No. 7,179,189, the disclosure of which is incorporated herein by reference.

The transmission 10 may further include an input sensor 26, an output sensor 28, and a transfer sensor 30 that monitor operating conditions of the transmission 10. The input sensor 26 monitors a rotational speed of an input shaft 32, which is generally indicative of the rotational speed of an output of the torque converter 18, while the output sensor 28 serves to monitor a rotational speed of an output shaft 34 of the transmission 10. The transfer sensor 30 monitors a speed of rotation of an output of the main box gear set 12 for use as in input to the underdrive assembly gear set 14. While an input sensor 26, an output sensor 28, and a transfer sensor 30 are disclosed, other sensors that provide an indication as to the operational performance of the transmission 10 could additionally or alternatively be used. For example, a throttle-angle sensor, brake sensor, and/or pressure switch may additionally or alternatively be in communication with the controller 36.

Each of the sensors 26, 28, 30 are in communication with a transmission controller 36 and provides the controller 36 with operating conditions of the transmission 10. The transmission controller 36 uses the operating data in conjunction with vehicle data received from vehicle sensors 38 in an effort to determine an optimum gear ratio for the transmission 10. Vehicle sensors 38 monitor vehicle speed and operator inputs, such as braking and accelerator pedal position. Selection of the optimum gear ratio provides the differential 20 with an appropriate input via output shaft 34 and, thus, enhances the performance of a vehicle to which the transmission 10 may be tied. While the vehicle sensors 38 are described as monitoring vehicle speed, braking, and accelerator pedal position, such parameters are exemplary in nature and are therefore not limited as such. Other vehicle operating parameters having bearing on transmission gear selection, such as braking, vehicle speed, and accelerator pedal position. As such, sensors may be in communication with the controller 36 such as, for example, a throttle-angle sensor, brake sensor, and/or pressure switch to supply the controller 36 with additional information related to vehicle operating parameters.

The controller 36 adjusts the engagement elements 16 to selectively apply different gears from the main box and underdrive assembly gear sets 12, 14 to provide the transmission 10 with an optimum output. The controller 36 may compare current operating conditions of the transmission (i.e., data received from sensors 26, 28, 30) with current vehicle operating conditions (i.e., data received from vehicles sensors 38) to determine an optimum gear ratio, and thus, an optimum transmission output. The optimum transmission output may be determined and used by the controller 36 to adjust timing of release and engagement of elements 16.

The main box gear set 12 includes a first and second planetary gear sets 40, 42 while the underdrive assembly gear set 14 includes a third planetary gear set 44, as best shown in FIG. 1. The planetary sets 40, 42, 44 provide the transmission 10 with seven different gears and a reverse gear. The engagement elements 16 include a series of individual clutches A-G and an additional "overrunning" clutch H disposed in the underdrive assembly 15, which are selectively engaged to provide the transmission 10 with a number of different gear ratios. Specifically, the controller 36, based on current operating conditions of the vehicle and the transmission 10, selectively applies respective clutches A-H to engage varying combinations of planetary sets 40, 42, 44 to provide a desired output gear ratio of the transmission 10.

As best shown in FIG. 2, clutches F and H are seemingly applied at the same time to achieve respective gears. However, clutch H is a so-called "overrunning" clutch and is only engaged (i.e., carries torque) when the transmission 10 experiences a positive torque. Conversely, when the transmission 10 experiences negative torque, clutch H is disengaged while clutch F is engaged. Therefore, for positive torque shifts, clutch F is not involved in the torque exchange during positive-torque shifts.

With reference to FIGS. 1-4, operation of the transmission 10 will be described in detail. When the vehicle is at idle (i.e., when the vehicle is in a parked or neutral condition), the torque converter 18 freely spins without transmitting a rotational force to the transmission 10 from the power plant 22.

However, once the vehicle is in a drive mode, a user may depress an accelerator (not shown) to send a signal indicative thereof to the transmission controller 36 via the vehicle sensor 38. As shown in FIG. 2, the controller 36 engages clutch A, E, and F so that the lowest, or first gear combination 1, is selected (each selection represented by an "X" in FIG. 2). It should be noted that for a positive torque condition, clutch H is engaged and carries torque and for a negative torque condition, clutch F is engaged and carries torque. Furthermore, whenever clutch H is disengaged, clutch F is engaged. The lowest gear 1 includes the highest gear ratio (i.e., 3.904) and, thus, provides the vehicle with the maximum torque. A high torque value for the first gear is desirable in that it provides the vehicle with the greatest acceleration from a rest position.

Once a predetermined speed is achieved, the controller 36 engages clutch G with clutch H releasing automatically, as the torque applied by the gearset drops to zero and becomes negative (the controller 36 will also release clutch F, but the torque on clutch F is zero, as clutch H is carrying all of the torque). After the speed change is complete, and clutch G is fully engaged, the transmission 10 has shifted sequentially from first gear 1 to second gear 2 and has shifted to a lower gear ratio (i.e., 3.904 to 2.688). The second gear 2 includes a lower gear ratio and, thus, provides less torque to the output shaft 34. However, it should be noted that while maximum torque is sacrificed, the overall efficiency is improved, as engine speed is reduced. The reduction in engine speed provides an increase in efficiency by reducing pumping losses in the power plant 22.

The shift from gear 1 to gear 2 is accomplished by a "single swap" shift such that the gear ratio of the transmission 10 is changed by swapping clutch H—associated with the underdrive assembly gear set 14—for clutch G, which is also associated with the underdrive assembly gear set 14. FIG. 2 clearly shows that clutches F and H are released or overrunning, and clutch G is engaged, thereby indicating a single swap shift. Therefore, the shift from gear 1 to gear 2 is accomplished entirely within the underdrive assembly 15 and is a single swap shift.

Figure 3:
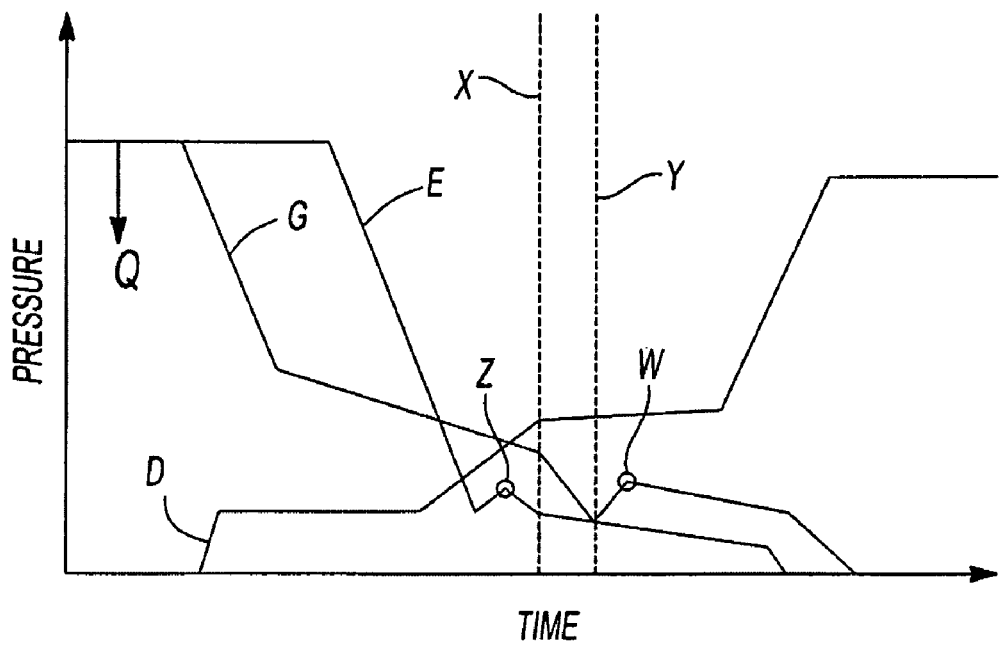
FIG. 3 is a graphical representation of the pressure curves for a double-swap shift event.

When the vehicle increases speed, the controller 36 initiates a shift from lower gear 2 to a higher gear 3, thereby changing the gear ratio from 2.688 to 2.161, as best shown in FIG. 3. The shift between gears 2 and 3 is accomplished by a "double swap" shift meaning that two clutches are released and two different clutches are applied. In this case, two single-swap shifts occur at the same time and make up the "double-swap" shift. First, a 1.8 ratio step upshift is being made in the main box gear set 12 while a 1.45 ratio step downshift occurs in the underdrive assembly gear set 14. The combination between the 1.8 ratio step upshift and the 1.45 ratio step downshift combine to provide a 1.24 ratio step 2-3 upshift and achieve the third gear ratio of 2.161.

In making the shift from gear 2 to gear 3, the controller 36 disengages clutch E and applies clutch D in the main box 13 and subsequently disengages clutch G and allows the torque to be carried by clutch H in the underdrive assembly 15 (clutch F is applied after the shift is complete). The double swap shift only yields an acceptable shift if the shift in the main box 13 is timed correctly with the shift in the underdrive assembly 15.

The main box shift is initiated by the controller 36 in response to vehicle conditions, as read by vehicle sensors 38 and transmission speed sensors 26, 28, and 30. Once the controller 36 indicates that an upshift is required (i.e., from gear 2 to gear 3), the fluid pressure applied to clutch D is increased while the fluid pressure applied to clutch E is decreased, as best shown in FIG. 3. In addition, the fluid pressure applied to clutch G is also reduced to thereby reduce the pressure to a predetermined pressure. The drop in applied pressure eventually disengages clutch E such that clutch E no longer couples the input speed on shaft 32 to output shaft 34 of the transmission 10 via gear set 42. Conversely, the increase in applied pressure to clutch D eventually fully applies clutch D such that gear set 40 couples the input speed on shaft 32 to the output shaft 34.

The release of clutch E and the engagement of clutch D is timed such that the exchange between clutch E and clutch D is slightly overlapped. In general, the releasing element (i.e., clutch E) will maintain some excess capacity until the applying element (i.e., clutch D) has enough capacity to hold engine torque. Once the applying element (i.e., clutch D) has enough capacity to hold the engine torque, the releasing element (i.e., clutch E) is disengaged.

FIG. 3 is a graphical representation of the aforementioned power shift from clutch E to clutch D, indicating the respective fluid pressure applied to each of clutch E and clutch D. From the plot, it can be seen that clutch E maintains engagement with gear set 42 until a sufficient pressure is experienced by clutch D. If the controller 36 determines that the swap between clutches E and D is not properly timed (i.e., where a sufficient pressure is not accurate for clutch D) one of two scenarios is possible.

In a first scenario, clutch D does not have enough capacity when clutch E has lost its capacity. In this situation, the controller 36 slightly increases the pressure of the releasing clutch E to maintain engagement with gear set 42, as indicated by a spike Z in FIG. 3. The slight increase in pressure (Z) is maintained by the controller 36 until clutch D experiences sufficient capacity to prevent slip and maintain engagement gear set 40. The spike Z is released by the controller 36 once there is sufficient capacity exerted on clutch D. Clutch D is being engaged while clutch E is being released to ensure a proper torque swap of the main box 13. In a second scenario, clutch D has capacity while E still has capacity, thereby resulting in an overlap condition. In this situation, the pressure of clutch D is modified to match the torque transfer on a subsequent shift.

To complete the shift from gear 2 to gear 3, the underdrive assembly 15 must also apply and release a set of clutches. Specifically, clutches F or H must take up the torque and clutch G must be released, as indicated in FIG. 2. The timing of the release of clutch G must be within a predetermined time after the main box 13 slips to ensure a proper output torque transition for the transmission 10.

Once the main box 13 slips (point X in FIG. 3), the controller 36 releases the pressure applied to clutch G such that clutch G begins to slip at point Y of FIG. 3. As previously discussed, the output torque begins to rise, because main box 13 is beginning the speed change of the upshift. The underdrive assembly 15 must slip within a predetermined time after the main box 13 slips to ensure that the downshift torque loss occurs at the same time as the upshift torque rise, thereby minimizing the overall torque disturbance of the 2 3 upshift of transmission 10. To ensure a proper output torque, the time to slip between the main box 13 and the underdrive assembly 15 should be within 20 to 120 milliseconds, and preferably between 40 and 70 milliseconds.

The time interval between the slipping of the main box 13 and the slipping of the underdrive assembly 15 is generally given as the distance between lines X and Y of FIG. 3. If the underdrive assembly 15 slips outside of the 20 to 120 millisecond window, the rate of change of the output torque of the transmission 10 will increase and the shift quality between gears 2 and 3 will deteriorate.

Figure 4:
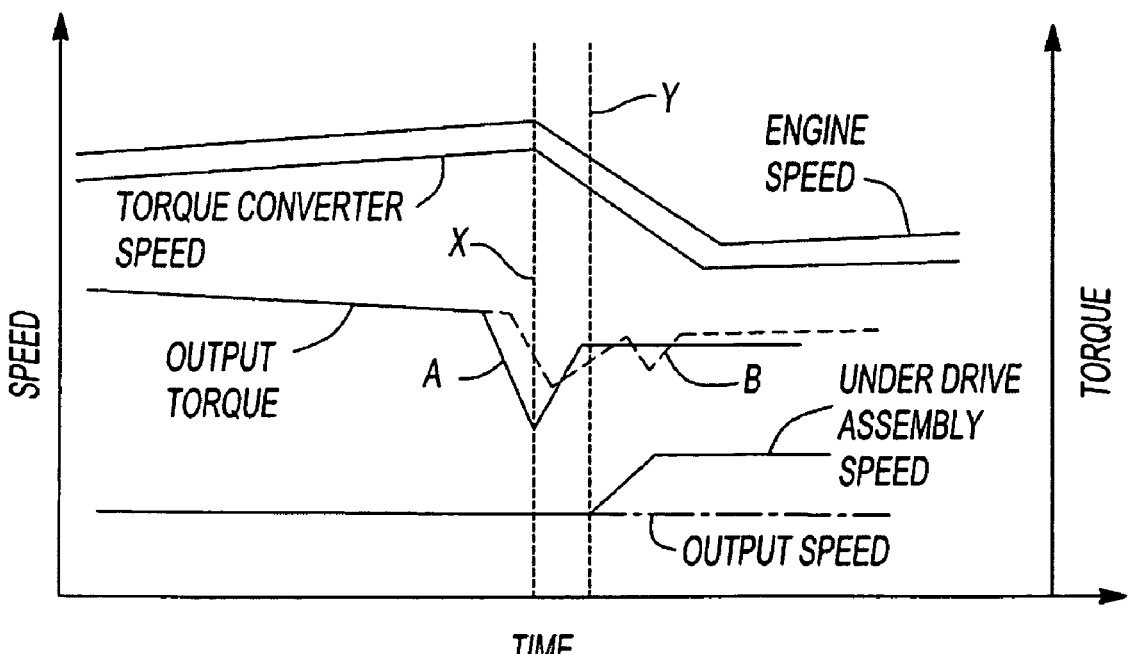
FIG. 4 is a graphical representation of an output torque and speed curves for the double-swap shift event of FIG. 3.

The increase in the rate of change of the output torque is shown in FIG. 4 between lines X and Y. In addition, speed plots for an acceptable speed change (i.e., one falling between points X and Y) are provided indicating torque converter 18, power plant 22 (i.e., engine), underdrive assembly 15, and transmission output speed.

If the distance between points X and Y in FIG. 3 is less than 20 milliseconds the output torque curve takes a shape similar to A. If that distance is greater than 120 milliseconds it takes a shape similar to B. While a window between 20 and 120 milliseconds generally results in an acceptable shift, the distance between lines X and Y is preferably between 40 and 70 milliseconds. The clutch pressures of applying clutch D and releasing clutch G must also be controlled to minimize the overall output torque disturbance.

As best shown in FIG. 3, the pressure applied to clutch G is released until clutch G slips. When slip occurs, the controller 36 increases the pressure on clutch G, to minimize the downshift speed change, torque loss, and uses engine torque management to minimize the output torque rise as shown in FIG. 3 at point W which naturally occur at the end of a power downshift. The controller 36 uses open loop control to complete the full release of clutch G within the time in which main box 13 completes its speed change.

The increase in pressure on clutch G when it slips is a function of flow, which minimizes the change in clutch pressure and the loss in torque during the downshift. The solenoid duty cycle controlling clutch G is chosen to result in zero flow. Just before the underdrive assembly 15 reaches target speed, the pressure applied to clutch G will be decreased using open loop control. If the target speed hasn't been achieved within a 100 milliseconds, the duty cycle control will also enter open loop control.

The hold pressure initial duty cycle applied to control clutch G is a function of oil temperature and input torque and may therefore be tailored to fit the particular system. To optimize slip time of the underdrive assembly 15 with respect to the main box 13, the oil temperature and input torque are monitored to adaptively correct the initial hold pressure (i.e., duty cycle) so slip is achieved in the desired 40 to 70 millisecond window. The initial hold pressure (i.e., duty cycle) is predicted from an adaptive surface such that the duty cycle required for the hold pressure is a function of oil temperature and input torque. The initial solenoid duty cycle used for the hold pressure is updated at the end of the shift, depending on the X-Y window. If the window is more than desired, the solenoid duty cycle is lowered and vice versa. The duty cycle is generally defined as the percentage a hydraulic fluid valve is open over a given time. Therefore, if slip falls outside of the 20 to 120 millisecond window, the duty cycle can be increased or decreased to bring the slip within the desired range.

In addition to monitoring oil temperature, the duty cycle of clutch G (i.e., the rate at which fluid is applied to clutch G) may also be turned off for approximately the first 100 milliseconds following the instruction to shift gears by the controller 36. Toggling the duty cycle off for the first 100 milliseconds of a shift sequence will cause the pressure in clutch G to drop in a direction Q, as best shown in FIG. 3. Such manipulation of the duty cycle is especially important in cases of low input torque. Under such conditions, the time required to achieve speed change with clutch D in the main box might not be enough to reach the required level. As previously discussed, the hold pressure must be at a point that will allow the underdrive assembly 15 to slip within 40 to 70 milliseconds after the main box 13 slips. Therefore, if the pressure applied to clutch G is too high initially, the underdrive assembly 15 will not slip within the requisite time frame, which adversely affects the output torque and, thus, the overall shift quality.

In addition to the foregoing, the torque input to the system via power plant 22, torque converter 18, and input shaft 32, may also be adjusted using torque management to improve shift quality. As can be appreciated, a lower input torque during the X-Y window will minimize the rate of increase on output torque. Conversely, a higher input torque will require an increase in pressure applied to clutch G to minimize the output torque rate of increase.

Once the gear change is complete, clutches A and D of the main box 13 are engaged, over running clutch H is carrying the torque of the underdrive assembly 15 and the gear ratio of the transmission 10 has moved from 2.688 to 2.161 as best shown in FIG. 2.

The controller 36 will sequentially move through each of the remaining gears 3-6 by selectively engaging and releasing clutches A-H until the sixth gear 6 is achieved, as best shown in FIGS. 1-2. The sixth gear 6 is achieved when clutches B, D, and G are engaged and provides the transmission 10 with the lowest torque and the lowest gear ratio (i.e., 0.652). Again, the sixth gear 6 is the highest gear and is engaged when the vehicle is moving at a relatively high speed. Therefore, even though the sixth gear 6 includes a low torque value, a high torque value is not required to propel the vehicle because the vehicle is already in motion. The reduced torque value improves efficiency by choosing the highest gear with the lowest ratio which provides the lowest engine speed and best fuel economy. At this point, the controller 36 has selectively engaged clutches A-H to sequentially move through each of the first six gears 1-6 until the sixth gear 6 with a gear ratio of 0.652 is selected, as best shown in FIG. 2.

If acceleration is required, the vehicle sensor 38 will send a signal to the controller 36 to downshift the transmission 10. During the downshift operation, the controller 36 compares vehicle operating conditions to current transmission operating conditions and selects an optimum lower gear to accommodate the requisite acceleration, and repeats the sequential shift sequences, employing the double swap operation to shift from gear 3 to gear 2 and the single swap operation to shift between each of the other gears.

Figure 6:
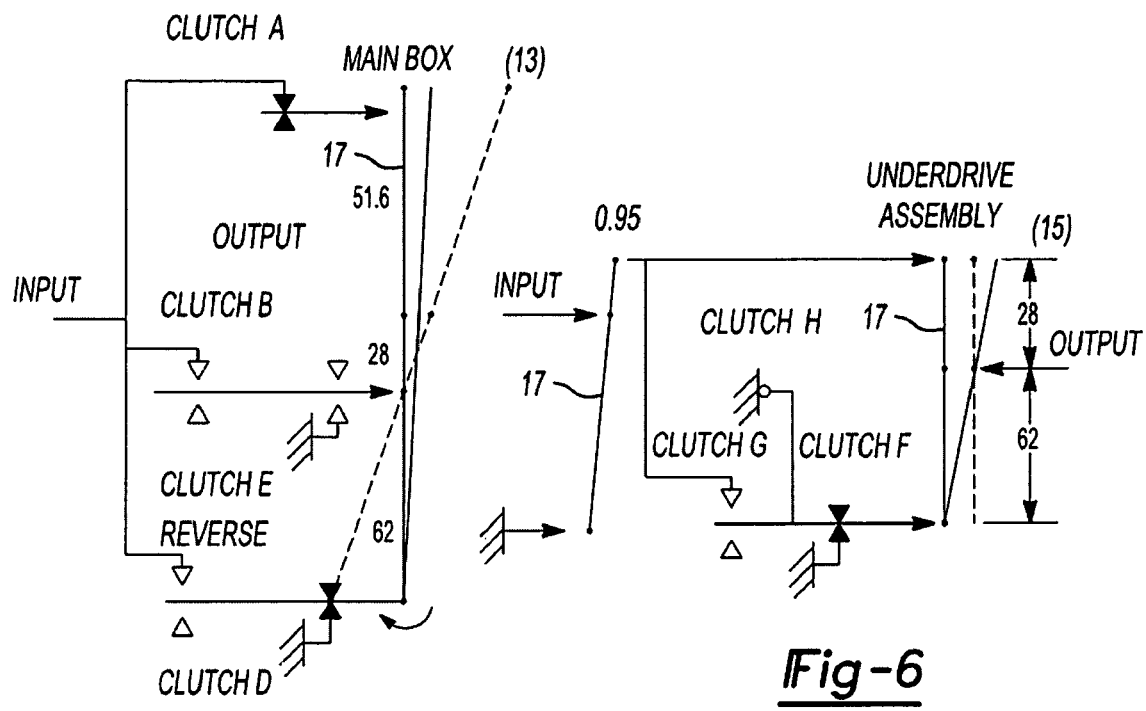
FIG. 6 is a lever analogy used for determining the output torque signature of FIG. 5.

The controller 36 may evaluate any of the foregoing shifts by evaluating a plot of transmission output torque shown in FIG. 3 to the timing, release, and engagement of the clutches A-H. In one configuration, the controller 36 may perform a lever analysis to determine the output torque of the transmission 10. FIG. 6 provides an exemplary schematic representation of a lever analysis for a 2-3 swap shift (described above) while FIGS. 7 and 8 schematically represent torque balance for the main box 13 and underdrive assembly 15, respectively.

Figure 7:
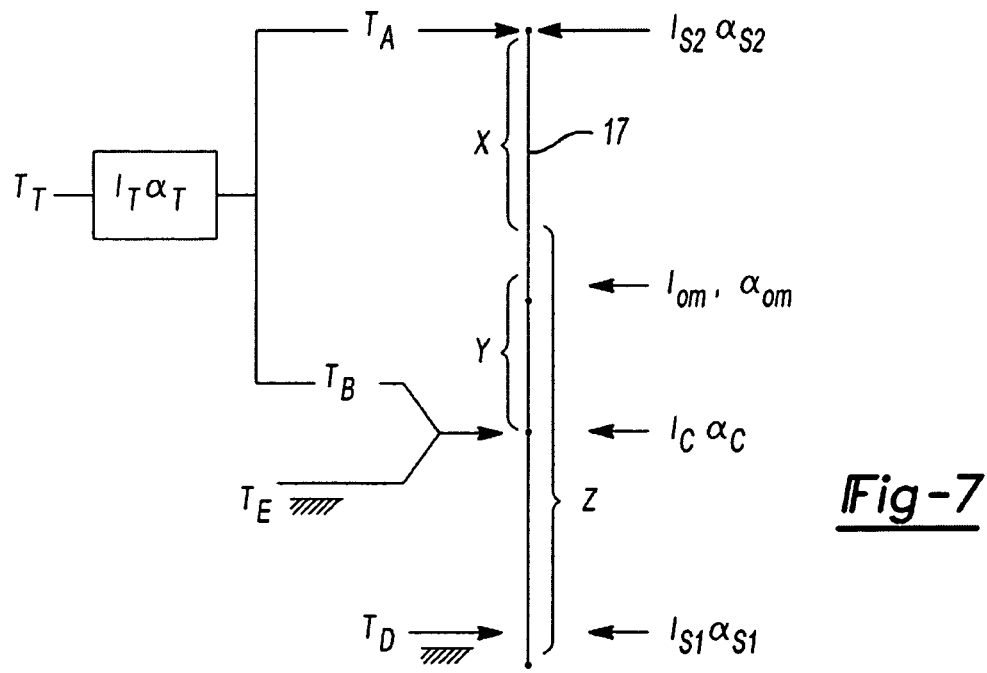
FIG. 7 is a lever analogy used in balancing torque in a main box of a transmission.
Figure 8:
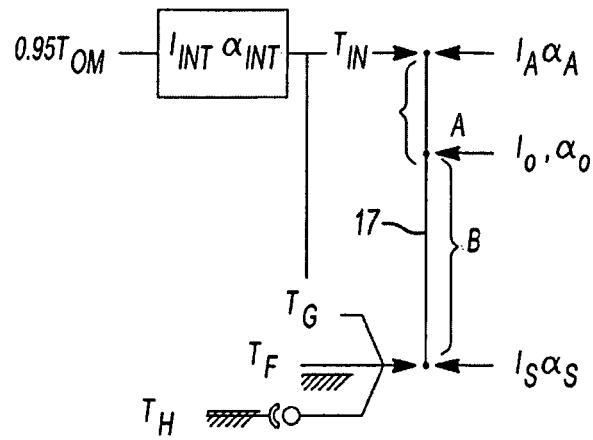
FIG. 8 is a lever analogy used in balancing torque in an underdrive assembly of a transmission.

As shown in FIGS. 7 and 8, a lever 17 is used to demonstrate that variables disposed on the left side of the lever 17 must balance those on the right side of the lever 17 to yield a smooth shift and prevent undesired output torque transients. The controller 36 adjusts the shift control timing and synchronization adaptively to yield an acceptable shift and uses the determined output torque as a measure of the shift quality.

An example of the above-described lever analysis for a 2-3 shift is shown in FIG. 6. As described above, clutches E and G are released and at the same time, clutches F and D are applied. The double shift between clutches E and G and clutches F and D results in a double shift, whereby an upshift is executed in the main box 13 and a downshift is executed in the underdrive assembly 15 simultaneously. While similar double shifts occur for the 3-2 shift (clutches F and D released and clutches G and E applied) and the 4-2 shift (clutches F and B released and clutches G and E applied), reference will be made hereinafter to the 2-3 shift to describe the lever analysis shown in FIG. 6.

FIG. 6 shows the relationship for a 2-3 shift in terms of a lever analogy. During the shift, the ratio of the main box 13 changes from 2.84 ((51.6+28)/28) to 1.57 ((51.6+28+62)/(28+62)) for a total change of 1.27. The ratio of the underdrive assembly 15 changes from 1.0 ((62+28)/(62+28)) to 1.452 ((62+28)/62) for a total change of 0.452. Based on the above, the overall ratio of the transmission 10 changes from 2.7 (2.84*0.95*1.0) to 2.16 (1.57*0.95*1.45) for a total change of 0.54. The following equations may be used in conjunction with the lever analogy of FIG. 6 to determine the overall output torque of the transmission 10.

FIG. 7 is an illustration of torque balance in the main box 13. The following variables are used in Equations 1-5, which provide a procedure for determining torque balance in the main box 13.

$T_{om}$=Mainbox Output Torque
$\alpha_{om}$=Mainbox Output Acceleration
$T_A$=Underdrive Clutch Torque
$T_B$=Overdrive Clutch Torque
$T_E$=Low Reverse Clutch Torque
$T_D$=Kickdown Clutch Torque
$I_{S2}$=Sun2 Inertia=0.00194 kgm$^2$
$\alpha_{S2}$=Sun2 Acceleration
$I_C$=Carrier Inertia=0.00748 kgm$^2$
$\alpha_C$=Carrier Acceleration
$I_{S1}$=Sun1 Inertia=0.00395 kgm$^2$
$\alpha_C$=Sun1 Acceleration
$T_T$=Turbine Torque
$I_T$=Turbine Inertia=0.066 kgm$^2$
$\alpha_T$=Turbine Acceleration
X=51.58
Y=28
Z=90

Equation 1 below represents a summation of torque for the transmission 10.

$$\Sigma T = T_{om} = T_A + T_B + T_E + T_D - I_{S2}\alpha_{S2} - I_C\alpha_C - I_{S1}\alpha_{S1} \quad (1)$$

From the lever analogy we can calculate $\alpha_{S2}$, $\alpha_{S1}$, $\alpha_C$ as a function of $\alpha_{OM}$, $\alpha_T$. From the input side we have Equation 2 below.

$$T_T - T_A - T_B = I_T \alpha_T \quad (2)$$

Substituting Equation 2 into Equation 1 yields Equation 3 below, where a,b are constants.

$$T_{om} = T_T + T_E + T_D + \quad (3)$$
$$\left(\frac{Y}{X}I_C + \frac{Z}{X}I_{S1} - I_T - I_{S2}\right)\alpha_T - \left(\left(1 + \frac{Z}{X}\right)I_{S1} + \left(1 + \frac{Y}{X}\right)I_C\right)\alpha_{OM}$$
-or-
$$T_{om} = T_T + T_E + T_D + a\alpha_T - b\alpha_{OM}$$

$$a = \left(\frac{Y}{X}I_C + \frac{Z}{X}I_{S1} - I_T - I_{S2}\right) = -0.057 \text{ kgm}^2 \quad (4)$$

$$b = \left(\left(1 + \frac{Z}{X}\right)I_{S1} + \left(1 + \frac{Y}{X}\right)I_C\right) = 0.0244 \text{ kgm}^2 \quad (5)$$

FIG. 8 is an illustration of torque balance in the underdrive assembly 15. The following variables are used in Equations 6-10, which provide a procedure for determining torque balance in the underdrive assembly 15.

$I_{INT}$=Input Underdrive Assembly=0.0117 kgm$^2$
$\alpha_{INT}$=Underdrive Assembly Input Acceleration
$I_A$=Underdrive Assembly Annulus Inertia=0.000429 kgm$^2$
$I_S$=Underdrive Assembly Sun Inertia=0.0000517 kgm$^2$
$\alpha_A$=Underdrive Assembly Annulus Acceleration
$\alpha_S$=Underdrive Assembly Sun Acceleration
$T_G$=Direct Clutch Torque
$T_F$=Launch Clutch Torque
$T_H$=Free Wheel Torque
A=28
B=62

The torque balance on the underdrive assembly 15 is provided below in Equation 6.

$$\Sigma T = T_o T_{IN} + T_G + T_H + T_F - I_S \alpha_S - I_A \alpha_A \quad (6)$$

Equation 7 provides the torque at the input side.

$$0.95 T_{oM} - T_{IN} - T_G = I_{INT} \alpha_{INT} \quad (7)$$

Using the lever analogy, $\alpha_A$ can be replaced by $\alpha_o$, $\alpha_S$, and substituting Equation 7 into Equation 6 yields Equation 8.

$$T_o = \quad (8)$$
$$0.95 T_{OM} + T_H + T_F - \left(I_S - \left(\frac{A}{B}\right)I_A\right)\alpha_S - I_A\left(\frac{A+B}{B}\right)\alpha_O - I_{INT}\alpha_{INT}$$
-or-
$$T_o = 0.95 T_{OM} + T_H + T_F - a_1 \alpha_S - b_1 \alpha_O - I_{INT}\alpha_{INT}$$

-where- (9)
$$a_1 = I_S - \left(\frac{A}{B}\right)I_A = -0.000142 \text{ kgm}^2$$

$$b_1 = I_A\left(\frac{A+B}{B}\right) = 0.000622 \text{ kgm}^2 \quad (10)$$

Thus, the overall equation that governs the transmission 10 is given by Equation 11.

$$T_o = 0.95(T_T + T_E + T_D + a\alpha_T - b\alpha_{OM}) T_H + T_F - a_1\alpha_S - b_1\alpha_O - I_{INT}\alpha_{INT}$$

—or—

$$T_O° = 0.95(T_T + T_E + T_D) + T_H + T_F + 0.000142\alpha_S - 0.000622\alpha_O - 0.01117\alpha_{INT} - 0.05415\alpha_T - 0.0213\alpha_{OM} \quad (11)$$

Four cases may be analyzed using Equations 1-11 to determine main box torque phase (Case 1), main box speed change (Case 2), main box and underdrive assembly speed change (Case 3), and speed at a target (Case 4).

Case 1: In the main box torque phase, Equation 11 reduces to the following relationship, as all other terms are substantially zero.

$$T_o = 0.95(T_T + T_E + T_D)$$

During the above shift, clutch E is releasing and clutch D is applying. Therefore, based on the lever ratio, the $T_D$ will rise and $T_E$ will drop. The result is a loss in torque that is approximately equal to 1.81 (2.84/1.57). In any event, the loss in torque should not exceed 1.81 (2.84/1.57) to maintain acceptable shift quality.

Case 2: In the speed change phase, and before the underdrive assembly 15 slips, Equation 11 reduces to the following relationship.

$$T_o = 0.95(T_T + T_E + T_D) - 0.0377\alpha_T$$

Figure 5:
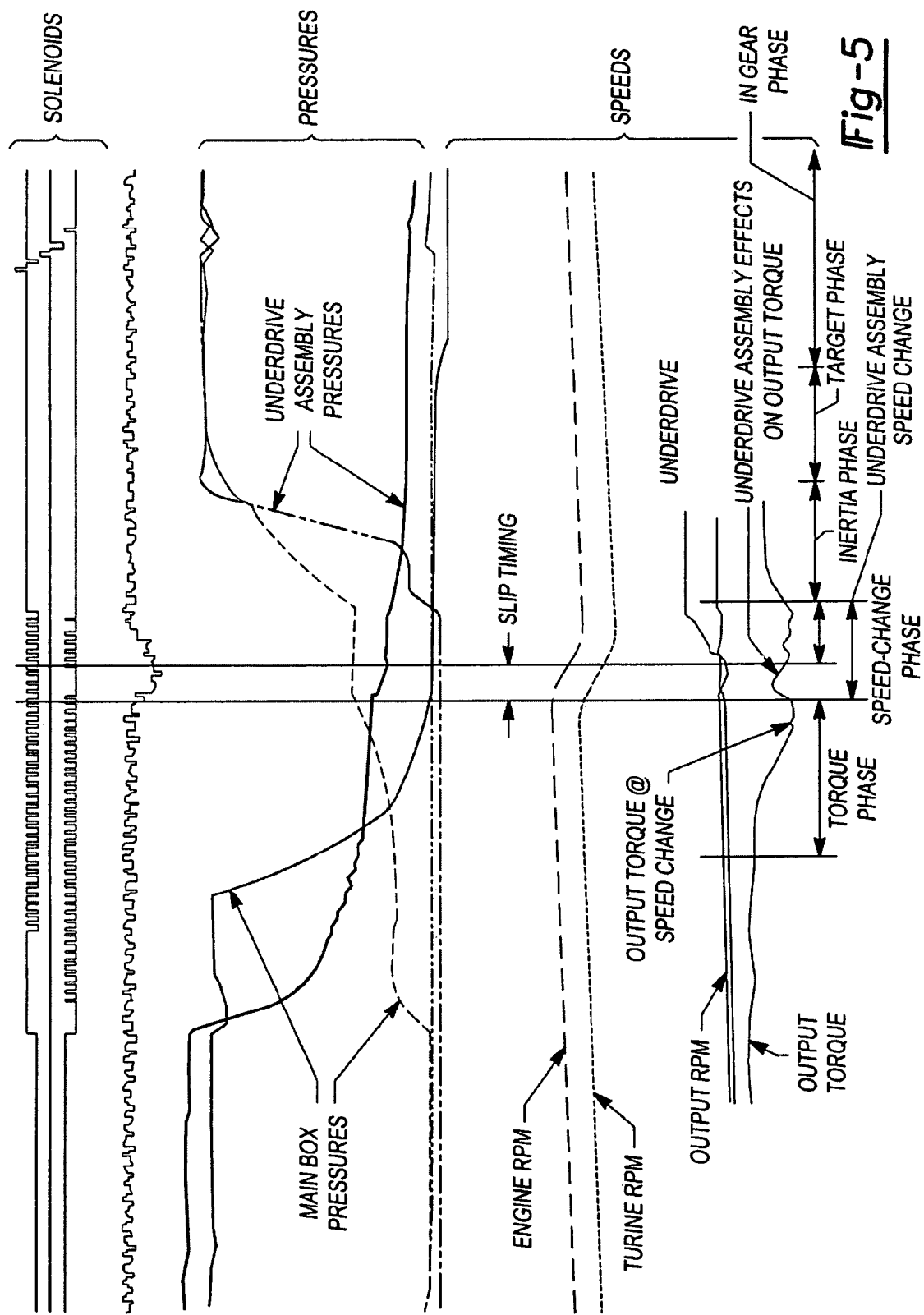
FIG. 5 is a graphical representation of pressure curves for a double-swap shift event including an output torque signature.

The output torque increases as a function of the last term in the above equation. The controller 36 coordinates slip of the underdrive assembly 15 to slip at exactly the torque level that prevents the torque drop from exceeding a ratio of 1.81 (2.84/1.57). The underdrive assembly 15 creates a substantially 1.45 ratio drop, which dictates that underdrive assembly slip does not occur at output torque above approximately $T_o*1.45$ of the speed-change phase (FIG. 5).

Case 3: During the speed change of the underdrive assembly 15, the following terms affect the Equation 11.

$$T_o \propto 0.000142\alpha_S - 0.000622\alpha_O - 0.0117\alpha_{INT} - 0.05415\alpha_T - 0.0213\alpha_{OM}$$

The last two inertia terms in the above equation add to the overall torque value while the first three subtract from the overall toque value, as $\alpha_S$ is negative to the overall torque value. In other words, the main box 13 is increasing the output torque and the underdrive assembly 15 is decreasing the output torque. The overall value of the torque output is illustrated in FIG. 5.

Case 4: At a target torque, Equation 11 reduces to the following two relationships at a power OFF condition and a power ON condition, respectively.

$$T_o = 0.95T_T + T_F; \text{ for power OF}$$

$$T_o = 0.95T_T + T_H; \text{ for power ON}$$

While the above analysis is shown for a 2-3 shift, a similar analysis can be done for a 3-2 kickdown shift.

The above equations illustrate that placing the underdrive assembly shift within the inertia phase of the main box 13 allows the shift to occur without being detected. By adjusting the timing, the increase in output torque in Case 2 above prevents the overall output torque from falling sharply, which, in turn, prevents a sharp or high rate drop in output torque and improves shift quality.

Variation of the output torque is a measure of shift smoothness. The output torque is a function of many dynamic terms, as can be seen in Equation 11 above. Because many factors influence the output torque, achieving a desired output torque profile is challenging. Achieving a desired output torque is further complicated during a double-swap shift, as two clutches are applied and two clutches are released.

FIG. 5 shows a 2-3 shift (i.e., a double-swap shift) with moderate input torque and includes solenoid duty cycles, main box and underdrive assembly pressures, and engine/turbine speeds during the 2-3 swap shift. As shown in FIG. 5, the solenoid duty cycle of a clutch is proportional to the corresponding clutch capacity. As such, the solenoid duty cycle and torque capacity curves can be used interchangeably.

The output torque signal details: the results of the torque transfer among all clutches applied and released (i.e., clutches E, G, F, D for the 2-3 shift) and is located near a bottom portion of FIG. 5. Because main box 13 is making an upshift while the underdrive assembly 15 is making a downshift, timing between release and application of the clutches generally dictates the quality of the shift. Timing amongst the clutches of the main box 13, the clutches of the underdrive assembly 15, as well as synchronization among the two assemblies 13, 15 is coordinated by the controller 36 to produce a desired output torque, as shown in FIG. 5. Any error in timing of application and/or release of clutches E, G, F, D will have an effect on the output torque and, therefore, on the shift quality.

As shown in FIG. 5, as the applying clutches (clutches F, D) are filling, the releasing clutches (clutches E, G) are timed to lose capacity at the same time the applying clutches have filled and are ready to carry torque. There may be a programmed delay before clutch E of the main box 13 begins to release so proper timing can be achieved. Timing of the main box 13 is done based on the fill pressure of the applying clutch and is based on "time to slip" of the releasing clutch (i.e., clutch E).

Timing of the underdrive assembly 15 includes controlling the releasing clutch to lose capacity at an exact and specific time. For example, clutch G of the underdrive assembly 15 should be at a torque capacity high enough to hold the clutch until the clutch is required to slip and low enough to force the underdrive assembly 15 to slip when conditions are satisfied. Because timing of the releasing clutch is directly related to shift quality, such timing is adaptive to system variation and conditions. For example, the controller 36 may "learn" from previous shifts and adaptively control the releasing clutches based on output torque and/or temperature.

The following procedure is directed to achieving an optimum shift quality by controlling the releasing clutches and timing such release with engagement of the engaging clutches. Because the initial duty cycle of clutch G of the underdrive assembly 15 sets the timing of release and engagement of clutches E, G, F, D, the initial duty cycle of clutch G dictates the outcome of the double-swap shift event for a 2-3 shift. The controller 36 may incorporate the following procedure to adaptively control the timing of the release of clutch G, whereby the controller 36 "learns" from previous shifts and applies the learned knowledge to control future shifts.

Figure 9:
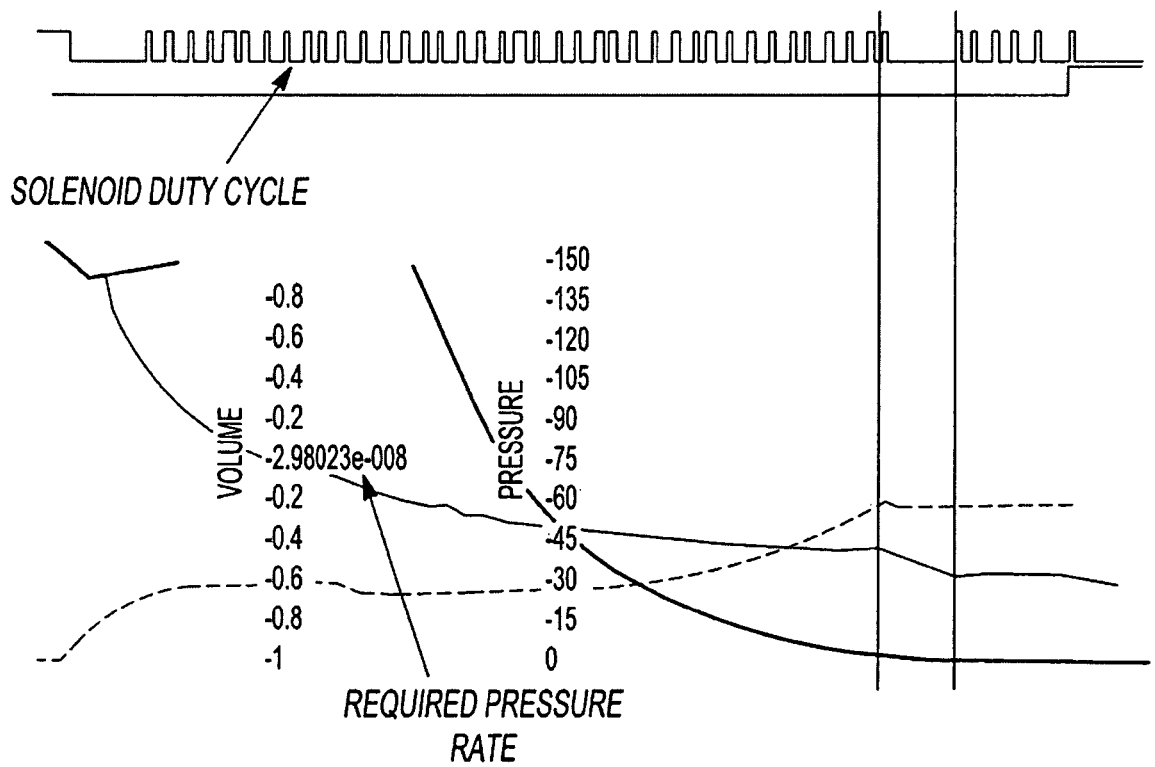
FIG. 9 is a pressure curve of a releasing clutch during a double-swap shift event.

As indicated above, slip time of the underdrive assembly 15 with respect to the main box 13 may be optimized by adaptively correcting the initial hold pressure (i.e., duty cycle) of the releasing clutch (i.e., clutch G) so slip is achieved in the desired 40 to 70 millisecond window. FIG. 9 provides a plot detailing the solenoid duty cycle and requisite hold pressure of clutch G. The initial hold pressure (i.e., duty cycle) may be predicted from an adaptive surface such that the duty cycle required for the hold pressure is a function of oil temperature and input torque.

The surface may include two independent variables (i.e., the first column and first row of Table 1, for example) and one dependent variable, whereby the surface is represented by 8 rows and 8 columns, as shown in Table 1 below. The surface may be in the form of a lookup table and may be stored in a memory of the controller 36. The controller 36 may adapt the surface during operation of the transmission 10 and therefore update Table 1 throughout and during operation of the transmission 10 to maintain stability in operation, regardless of the input torque and operating temperature.

Three variables may be utilized by the controller 36 in determining the duty cycle and may include the driver's demanded torque ($T_q$), transmission oil temperature ($T_o$), and learned duty $DC_L$ of the releasing clutch of the underdrive assembly, whereby the learned duty cycle $DC_L$ is the learned duty cycle of the releasing clutch (i.e., clutch G for a 2-3 shift) in the underdrive assembly 15.

TABLE 1

Surface Lookup Table
$DC_L$

|         | $T_{q,1}$ | $T_{q,2}$ | $T_{q,3}$ | $T_{q,4}$ | $T_{q,5}$ | $T_{q,6}$ | $T_{q,7}$ | $T_{q,8}$ |
|---------|-----------|-----------|-----------|-----------|-----------|-----------|-----------|-----------|
| $T_{O1}$ | $DC_{L1,1}$ | $DC_{L1,2}$ | $DC_{L1,3}$ | $DC_{L1,4}$ | $DC_{L1,5}$ | $DC_{L1,6}$ | $DC_{L1,7}$ | $DC_{L1,8}$ |
| $T_{O2}$ | $DC_{L2,1}$ | $DC_{L2,2}$ | $DC_{L2,3}$ | $DC_{L2,4}$ | $DC_{L2,5}$ | $DC_{L2,6}$ | $DC_{L2,7}$ | $DC_{L2,8}$ |
| $T_{O3}$ | $DC_{L3,1}$ | $DC_{L3,2}$ | $DC_{L3,3}$ | $DC_{L3,4}$ | $DC_{L3,5}$ | $DC_{L3,6}$ | $DC_{L3,7}$ | $DC_{L3,8}$ |
| $T_{O4}$ | $DC_{L4,1}$ | $DC_{L4,2}$ | $DC_{L4,3}$ | $DC_{L4,4}$ | $DC_{L4,5}$ | $DC_{L4,6}$ | $DC_{L4,7}$ | $DC_{L4,8}$ |
| $T_{O5}$ | $DC_{L5,1}$ | $DC_{L5,2}$ | $DC_{L5,3}$ | $DC_{L5,4}$ | $DC_{L5,5}$ | $DC_{L5,6}$ | $DC_{L5,7}$ | $DC_{L5,8}$ |
| $T_{O6}$ | $DC_{L6,1}$ | $DC_{L6,2}$ | $DC_{L6,3}$ | $DC_{L6,4}$ | $DC_{L6,5}$ | $DC_{L6,6}$ | $DC_{L6,7}$ | $DC_{L6,8}$ |
| $T_{O7}$ | $DC_{L7,1}$ | $DC_{L7,2}$ | $DC_{L7,3}$ | $DC_{L7,4}$ | $DC_{L7,5}$ | $DC_{L7,6}$ | $DC_{L7,7}$ | $DC_{L7,8}$ |
| $T_{O8}$ | $DC_{L8,1}$ | $DC_{L8,2}$ | $DC_{L8,3}$ | $DC_{L8,4}$ | $DC_{L8,5}$ | $DC_{L8,6}$ | $DC_{L8,7}$ | $DC_{L8,8}$ |

In Table 1, $T_{q,j}$ is the driver's demanded torque breakpoint at column j where j=1, 2, ..., 8, $T_{Oi}$ is the transmission oil temperature (° C.) breakpoint at row i where i=1, 2, ..., 8, and $DC_{Li,j}$ is the learned initial duty cycle of the underdrive assembly releasing clutch breakpoint in row i and column j.

Computing the four-nearest neighbor points in a surface lookup table, such as Table 1, utilizes a linear combination of two terms. Each data point in Table 1 is defined by three coordinates; x, y, and z. At any given time, the point of interest (i.e., desired output torque) lies in a region consisting of four adjacent points (i,j), (i,j+1), (i+1,j), (i+1,j+1) where i and j are the row and column indices, respectively. The temperature, $T_O$, is stored in the row that is the y-dimension, the driver's demanded torque, $T_q$, is stored in the column that is the x-dimension, and the duty cycle, $DC_L$, is stored in the z-dimension. At any time, $T_O$ and $T_q$ are known, but $DC_L$ is computed, as a simple linear combination using Equations 12-14 below.

$$DC_L = w_i DC_{L,i} + w_{i+1} DC_{L,i+1} \quad (12)$$

$$DC_{L,i} = \text{Linear Interpolation of } DC_L \text{ in row } i. \quad (13)$$
$$= DC_{Li,j} + \left(\frac{DC_{Li,j+1} - DC_{Li,j}}{T_{q,j+1} - T_{q,j}}\right)(T_q - T_{q,j})$$

$$DC_{L,i+1} = \text{Linear Interpolation of } DC_L \text{ in row } i+1. \quad (14)$$
$$= DC_{Li+1,j} + \left(\frac{DC_{Li+1,j+1} - DC_{Li+1,j}}{T_{q,j+1} - T_{q,j}}\right)(T_q - T_{q,j})$$

-where- $i = 1, \ldots, 8.$ $j = 1, \ldots, 8.$ $w_i$ = Temperature weighting factor in row $i$. (15)
$= (T_{Oi+1} - T_O)/(T_{Oi+1} - T_{Oi})$ with $i + 1 \leq 8$.
$= 1$ with $i = 8$
$= 1$ with $i = 1$ and $T_O < T_{Oi}$.

$w_{i+1}$ = Temperature weighting factor in row $i+1$.

$= 1 - w_i$ $T_q$ = Measured driver's demanded torque $T_O$ = Measured transmission oil temperature

**The remaining parameters are previously defined.

As can be seen in Equation 13, $DC_{L,i}$ is computed as a linear interpolation of a straight line defined between points (i,j) and (i,j+1) using the $T_q$ and $DC_L$ components. Likewise for $DC_{L,i+1}$ in Equation 14, $DC_{L,i}$ is computed as a linear interpolation of a straight line defined between the points of (i+1,j) and (i+1,j+1). In Equations 15 and 16, two weighting factors ($w_i, w_{i+1}$) are computed based on the location of the measured temperature point in the $T_O$-axis (y-axis). As a result, the final value of $DC_L$ is calculated as a linear combination that includes two terms ($DC_{L,i}, DC_{L,i+1}$) and their corresponding factors ($w_1, w_2$).

With reference to Table 1, operation of the transmission 10 and controller 36 as it pertains to the hold pressure of the releasing clutches will be described in detail. The controller 36 learns $DC_L$ during double-swap shift based on the location of the oil temperature and input torque within Table 1. Upon system reset, the controller 36 initializes and populates Table 1 with known values. In order to adjust $DC_L$ once per shift, the controller 36 requires stable conditions such as driver's demanded torque, $T_q$, to be constant within a predetermined value from the initial value during the double-swap shift (i.e., 2-3 shift, for example). The learning algorithm determines the two rows (i, i+1) where the measured transmission oil temperature falls within Table 1, and determines the two columns (i, j+1) where the actual $T_q$ falls within Table 1.

The duty cycles of the two nearest neighbor breakpoints are adjusted in the two rows of interest i and i+1. The remaining points are maintained in increasing order in their corresponding rows and columns. The controller examines every duty cycle point within Table 1 and updates each duty cycle to keep every row and column in increasing order to be consistent with the observation of the dynamic system behavior. Equations 17-20 outline the adjustment made by the controller 36 to Table 1 during operation of the transmission 10. The following adjustment is carried out as described below:

$$DC_{Li,j} = DC_{Li,j}(k-1) \pm \delta L_i \quad (17)$$

$$DC_{Li,j+1} = DC_{Li,j+1}(k-1) \pm \delta H_i \quad (18)$$

$$DC_{Li+1,j} = DC_{Li+1,j+1}(k-1) \pm \delta H_{i+1} \quad (19)$$

$$DC_{Li+1,j+1} = DC_{Li+1,j+1}(k-1) \pm \delta H_{i+1} \quad (20)$$

**(k–1) represents the previous value of the breakpoint.

An increment is applied if the slip between the underdrive assembly 15 and the main box 13 is within a time window less than a predetermined value (i.e., less than fifty milliseconds, for example). Conversely, a decrement is applied when the slip occurs within a time window greater than a predetermined value (i.e., greater than seventy milliseconds, for example). Note that there is no change (i.e., an increment or decrement is not applied) when the slip falls within a predetermined window of time (i.e., fifty to seventy milliseconds, for example).

—where—

$\delta L_i$ = Lower breakpoint increment/decrement in row $i = w_i \epsilon \text{Low}$ $\delta H_i$ = Higher breakpoint increment/decrement in row $i = w_i \delta \text{High}$ $\delta L_{i+1}$=Lower breakpoint increment/decrement in row $i+1=w_{i+1}\cdot\delta\text{Low}$ $\delta H_{i+1}$=Higher breakpoint increment/decrement in row $i+1=w_{i+1}\cdot\delta\text{High}$ —where—

$\delta\text{High}=\Delta_{DC}[T_q-T_{q,j}]\div[T_{q,j+1}-T_{q,j}]$ $\delta\text{Low}=\Delta_{DC}-\delta\text{High}$ $\Delta_{DC}$ is the maximum underdrive assembly learning increment/decrement $T_{qi}$ is the driver's demanded torque at start of shift where $T_{q,j}\leq T_{q,j}\leq T_{q,i+1}$.

$T_{q,j}$ is the driver's demanded torque at the lower breakpoint in the table.

$T_{q,j+1}$ is the driver's demanded torque at the higher breakpoint in the table.

The computation of a surface point in the lookup table (Table 1), as well as the learning algorithm discussed above, may be used by the controller 36 in performing the double-swap shift (i.e., a 2-3 double swap shift, for example).

Figure 10:
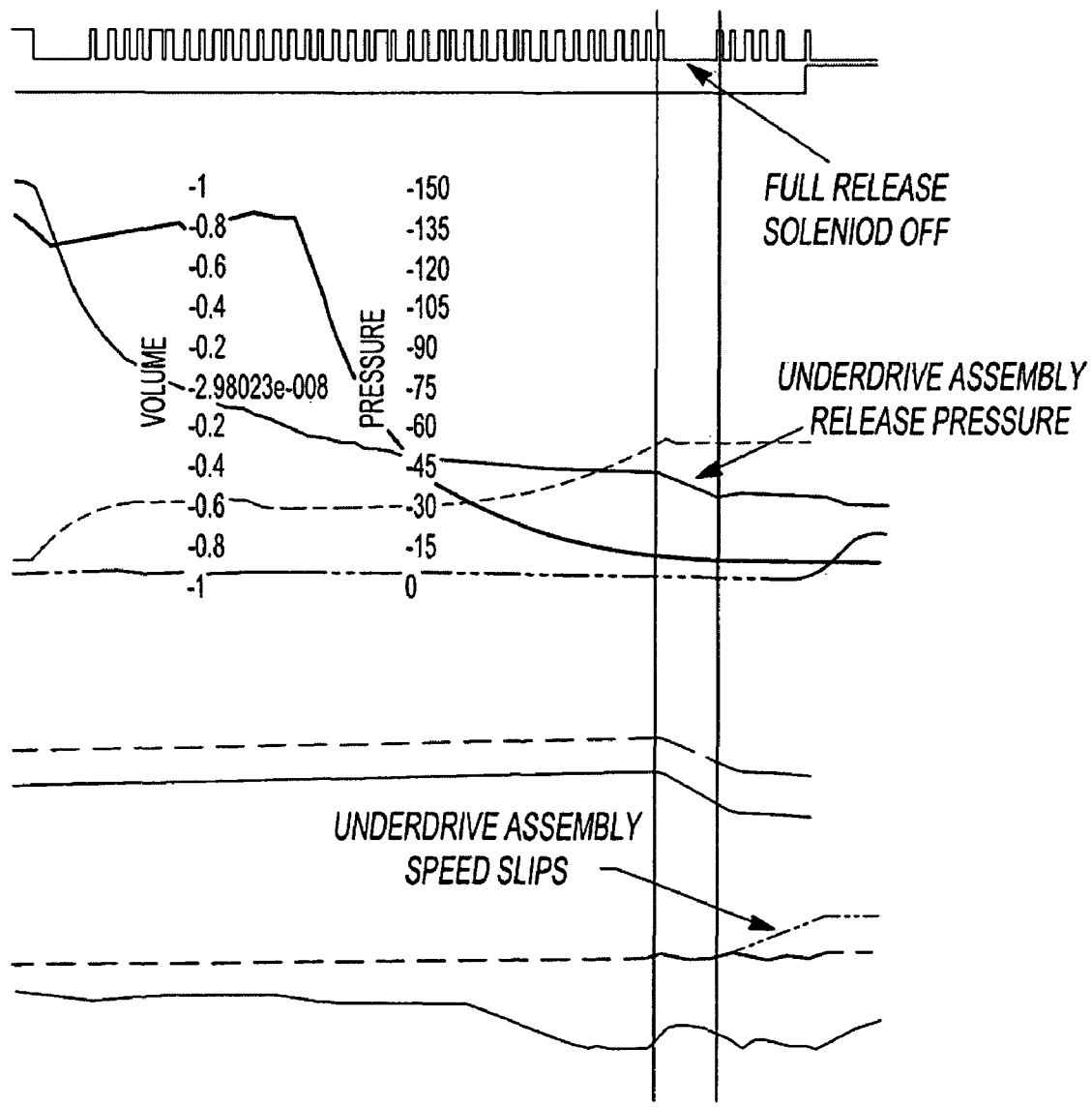
FIG. 10 is a graphical representation of pressure curves for a double-swap shift event including an output torque signature during a shift event.

FIG. 10 is a plot showing a full release of the underdrive assembly releasing clutch, which occurs when the main box 13 begins to slip. Based on the duty cycle of the releasing and applying clutches, the torque input to the underdrive assembly 15 increases drastically at this point. Therefore, the controller 36 releases the releasing clutch of the underdrive assembly 15 within in the next thirty to seventy milliseconds following slip of the main box 13 to aid the underdrive assembly 15 in beginning its shift.

Figure 11:
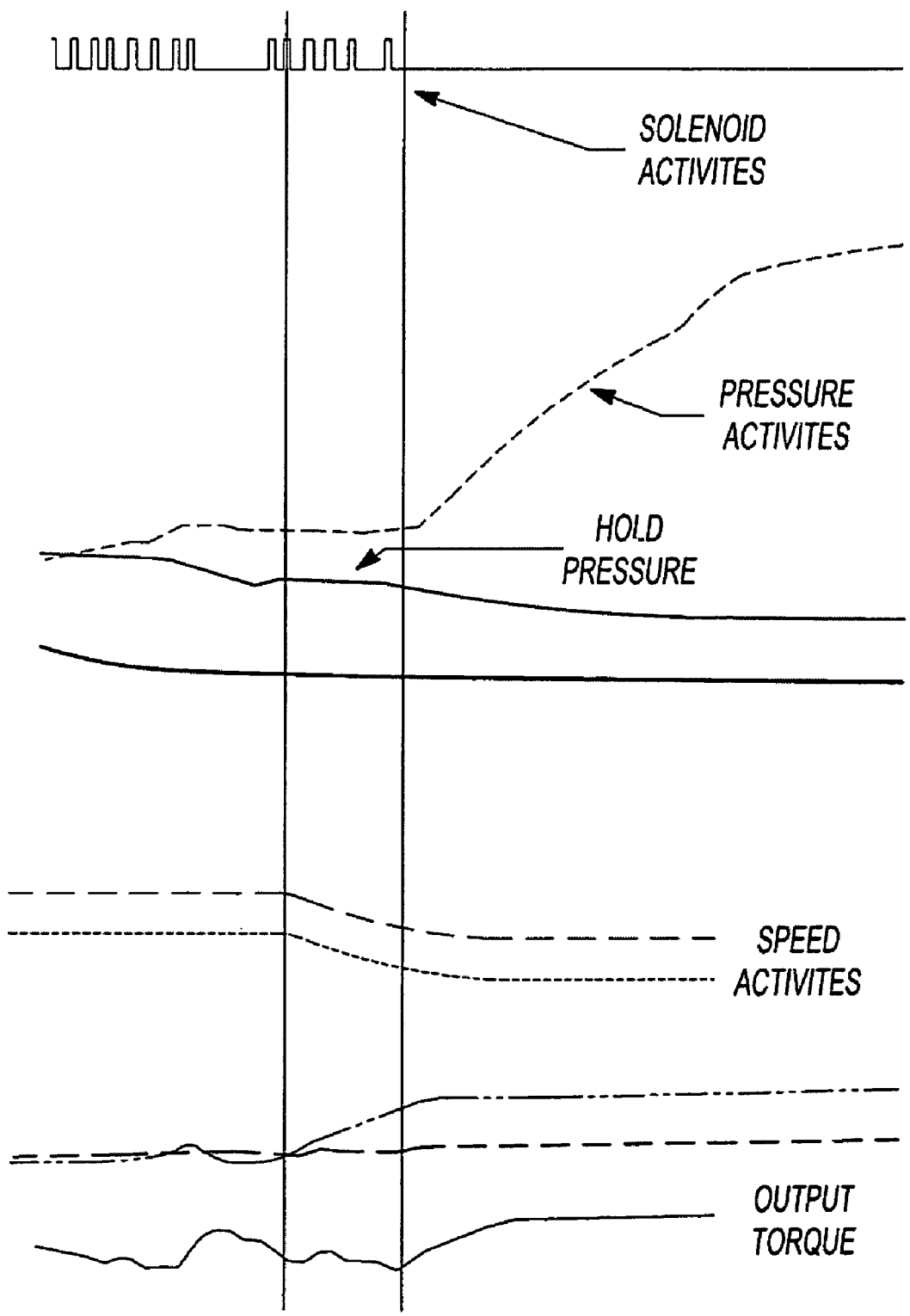
FIG. 11 is a graphical representation of pressure curves for a double-swap shift event in the inertia phase of a double swap shift event.

With reference to FIG. 11, the underdrive assembly hold pressure controls the underdrive assembly release clutch speed change. The underdrive assembly release pressure is held constant until underdrive assembly speed change is complete.

While the controller 36 is described as including a table having two independent variables and one dependent variable stored therein for determining a hold pressure on releasing clutches of an underdrive assembly 15, the controller 36 could additionally or alternatively include a table that includes additional independent variables (i.e., "n" independent variables) to further refine operation of the transmission 10. As shown in equation 11, the output torque is a function of many dependent terms, and its profile is a measure of shift smoothness. Achieving a desired output torque profile is difficult for a single-swap shift and even more so for a double-swap shift (i.e., the 2-3 swap shift (FIG. 5), for example).

The surface may be an nth-order table (Equation 21) and may be stored in a memory of the controller 36. The controller 36 may adapt the equation during operation of the transmission 10 and update the equation throughout and during operation of the transmission 10 to maintain stability in operation, regardless of the input torque and operating temperature. Furthermore, the controller 36 may supplement Equation 21 with more or less variables depending on the configuration of the overall system.

To compute a single point for a dependent variable that is related to n independent variables, the following procedure may be followed by the controller 36. The first step is to set $F_{n\times m}$ to be a data table based on Equation 21 with n rows and m columns representing a relationship between a dependent variable F and n independent variables $x_1$ to $x_n$. Each row consists of m points representing a relationship between the dependent variable, F, and one independent variable, $x_i$ where i=1, 2, . . . , n. In one configuration, the independent variables are input torque and oil temperature. While input torque and oil temperature are disclosed, any variable related to a variable of interest (i.e., the duty cycle of a releasing clutch, for example) may be included such as, for example, engine torque and/or battery charge.

$$F_{n\times m} = \begin{bmatrix} f_{11}(x_{11}) & f_{12}(x_{12}) & \ldots & \ldots & f_{1m}(x_{1m}) \\ f_{21}(x_{21}) & f_{22}(x_{22}) & \ldots & \ldots & f_{2m}(x_{2m}) \\ \vdots & \vdots & \ldots & \ldots & \vdots \\ \vdots & \vdots & \ldots & \ldots & \vdots \\ f_{n1}(x_{n1}) & f_{n2}(x_{n2}) & \ldots & \ldots & f_{nm}(x_{nm}) \end{bmatrix} \quad (21)$$

Therefore, $F(x_{i1}, x_{i2}, \ldots, x_{im})=[f_{i1}(x_{i1})f_{i2}(x_{i12}) \ldots f_{im}(x_{im})]$, i=1, . . . , n is a relationship between independent variables $x_i$ and dependent variable F.

If each independent variable, $x_i$, has a degree of influence or a weighting factor, $w_i$, on F, then, F(j) is a linear combination of all of the independent variables at any point j, as shown in Equation 22.

$$F(j) = \sum_{i=1}^{n} w_i f_{ij}(x_{ij}) \quad (22)$$

These weighting factors can be individually assigned and must satisfy the following constraint:

$$\sum_{i=1}^{n} w_i = 1, \text{ with } 0 \leq w_i \leq 1 \quad (23)$$

If $x_{ik}$ falls between two breakpoints $x_{ij}$ and $x_{i(j+1)}$ associated with the $i^{th}$ row, then, $f_{ik}(x_{ik})$ is computed as linear interpolation between $f_{ij}(x_{ij})$ and $f_{i(j+1)}(x_{i(j+1)})$. A first order linear interpolation yields Equation 24.

$$f_{ik}(x_{ik}) = f_{ij}(x_{ij}) + \left(\frac{f_{i(j+1)}(x_{i(j+1)}) - f_{ij}(x_{ij})}{x_{i(j+1)} - x_{ij}}\right)(x_{ik} - x_{ij}) \quad (24)$$

Equation 22 holds true for all points of $x_{ik}$ and $f_{ik}(x_{ik})$. If $x_{ik}$ is substituted for $x_{ij}$ and $f_{ik}(x_{ik})$ for $f_{ij}(x_{ij})$ in Equation 22, Equation 24 can be solved for Equation 25.

$$F(k) = \sum_{i=1}^{n} \left[w_i\left(f_{ij}(x_{ij}) + \left(\frac{f_{i(j+1)}(x_{i(j+1)}) - f_{ij}(x_{ij})}{x_{i(j+1)} - x_{ij}}\right)(x_{ik} - x_{ij})\right)\right] \quad (25)$$

The following is an application of the nth-order lookup computation method that can be used by the controller 36 to determine the initial learned duty cycle of the releasing clutch of the underdrive assembly 15 during a double-swap shift such as, for example, a 2-3 shift.

The following variables will be used in the example demonstrating use of the nth-order lookup method given by Equation 21:

n=2
m=8
F=$DC_L$=Initial learned duty cycle of the releasing clutch of the undedrive assembly
$x_1 = T_q$=Driver's demanded torque
$x_2 = T_O$=Transmission oil temperature As indicated above, the only two independent variables are driver's demanded torque ($T_q$) and transmission oil temperature ($T_O$), which are the only two independent variables used in the surface lookup table of Table 1. Therefore, not only can the nth-order lookup method given by Equation 21 be used to calculate hold pressure (i.e., adaptive duty cycle) with n independent variables, such an nth-order lookup table can be used to calculate the surface lookup table shown in Table 1. Because the controller 36 can use either the surface lookup table of Table 1 having two independent variables and one dependent variable or the nth-order lookup method given by Equation 21 to determine hold pressure when there are only two independent variables (i.e., demand torque and oil pressure, for this example), the controller 36 may perform both calculations simultaneously or independently to verify the calculated hold pressure using each method.

As discussed above, the initial duty cycle of the releasing clutch of the underdrive assembly 15 has a direct influence on the success of the double-swap shift. A second order (i.e., two independent variable) lookup table may be used by the controller 36 using Table 1 described above. The controller 36 may additionally or alternatively utilize an nth-order table to determine the initial duty cycle of the releasing clutch of the underdrive assembly 15. If the nth-order table includes a pair of independent variables (i.e., two independent variables), the nth-order lookup table will be similar to Table 1, as represented below in Equation 26.

$$DC_L = \begin{bmatrix} f_{11}(x_{11}) f_{12}(x_{12}) f_{13}(x_{13}) f_{14}(x_{14}) f_{15}(x_{15}) f_{16}(x_{16}) f_{17}(x_{17}) f_{18}(x_{18}) \\ f_{21}(x_{21}) f_{22}(x_{22}) f_{23}(x_{23}) f_{24}(x_{24}) f_{25}(x_{25}) f_{26}(x_{26}) f_{27}(x_{27}) f_{28}(x_{28}) \end{bmatrix} \quad (26)$$

$x_1 = [x_{11} x_{12} x_{13} x_{14} x_{15} x_{16} x_{17} x_{18}]$ = Driver's demanded torque breakpoints.

$x_2 = [x_{21} x_{22} x_{23} x_{24} x_{25} x_{26} x_{27} x_{28}]$ = Transmission oil temperature (°C.) breakpoints.

While the controller 36 can use a two-independent variable table such as Table 1 to determine the learned duty cycle of the releasing clutch, the controller 36 could also perform the same calculation using an nth-order lookup table, as shown in Equation 21. The controller 36 may rely on both a two independent variable lookup table (i.e., Table 1) and an nth-order lookup table (i.e., Equation 21) to confirm the results of each if only two independent variables are used. If more than two independent variables are used, the nth-order lookup table of Equation 21 must be used.

The weighting factors are chosen to be proportional to the distance of the point of interest, $x_{2k}$, and the two consecutive breakpoints of $x_{2j}$ and $x_{2(j+1)}$.

$$w_1 = \begin{cases} 1, \text{ with } x_{2k} \leq x_{21} \\ \frac{x_{2(j+1)} - x_{2k}}{x_{2(j+1)} - x_{2j}}, \text{ with } x_{2j} \leq x_{2k} \leq x_{2(j+1)} \\ 0, \text{ with } x_{2k} \geq x_{28} \end{cases} \quad (27)$$

$w_2 = 1 - w_1$

For any points of interest $x_k$, Equation 25 can be reduced to Equation 28.

$$DC_L^{(k)} = \begin{cases} w_1\left(f_{1j}(x_{1j}) + \left(\frac{f_{1(j+1)}(x_{1(j+1)}) - f_{1j}(x_{1j})}{x_{1(j+1)} - x_{1j}}\right)(x_{1k} - x_{1j})\right) + \\ w_2\left(f_{2j}(x_{2j}) + \left(\frac{f_{2(j+1)}(x_{2(j+1)}) - f_{2j}(x_{2j})}{x_{2(j+1)} - x_{21j}}\right)(x_{2k} - x_{2j})\right) \end{cases} \quad (28)$$

The above second order lookup table is reduced to a surface lookup table for the four-nearest neighbor points which is implemented by two simple linear interpolations, which is similar to Table 1 discussed above. The first linear interpolation is between points $x_{1j}$, $x_{1(j+1)}$, $f_{1j}(x_{1j})$, and $f_{1(j+1)}(x_{1(j+1)})$. The second linear interpolation is between points $x_{2j}$, $x_{2(j+1)}$, $f_{2j}(x_{2j})$, and $f_{2(j+1)}(x_{2(j+1)})$. The result of the two linear interpolations is a linear combination weighted by $w_1$ and $w_2$, respectively, as given by Equation 28.

The learned initial duty cycle, $DC_L$, is proportional to the learned torque capacity of the releasing clutch during a double-swap shift. The controller 36 uses the following procedure to "learn" $DC_L$.

Upon system reset, the table (of Equations 23 and 30) is initialized with known values. In order for the controller 36 to adjust $DC_L$ once per shift, the controller 36 must have stable conditions such as drivers demanded torque, $T_q$, to be constant within a predetermined value from the initial value during the double-swap shift. The learning algorithm uses the actual values of the demanded driver's torque, $x_{1k}$, and the transmission oil temperature, $x_{2k}$, to determine the break- points $x_{1j}$, $x_{1(j+1)}$, $f_{1j}(x_{1j})$, $f_{1(j+1)}(x_{1(j+1)})$, $x_{2j}$, $x_{2(j+1)}$, $f_{2j}(x_{2j})$, and $f_{2(j+1)}(x_{2(j+1)})$. The $f_{1j}(x_{1j})$, $f_{1(j+1)}(x_{1(j+1)})$, $f_{2j}(x_{2j})$, and $f_{2(j+1)}(x_{2(j+1)})$ are the adjusted breakpoints according to Equation 29, which is shown below. After the adjustment, every row is kept in increasing order in the table defined by Equation 26. The adjustment is carried out as described below.

$DC_L(x_{1j}) = f_{1j}(x_{1j}) = f_{1j}(x_{1j})_{-1} \delta L_1$ $DC_L(x_{1(j+1)}) = f_{1(j+1)}(x_{1(j+1)}) = f_{(j+1)}(x_{1(j+1)})_{-1} \pm \delta H_1$ $DC_L(x_{2j}) = f_{2j}(x_{2j}) = f_{2j}(x_{2j})_{-1} \pm \delta L_2$.

$DC_L(x_{2(j+1)}) = f_{2(j+1)}(x_{2(j+1)}) = f_{2(j+1)}(x_{2(j+1)})_{-1} \pm \delta H_2 \quad (29)$ An increment is applied if the slip between the underdrive assembly 15 and the main box 13 is within a time window less than a predetermined value (i.e., less than fifty milliseconds, for example). Conversely, a decrement is applied when the slip occurs within a time window greater than a predetermined value (i.e., greater than seventy milliseconds, for example). Note that there is no change (i.e., an increment or decrement is not applied) when the slip falls within a predetermined window of time (i.e., fifty to seventy milliseconds, for example). Note that variables $f_{1j}(x_{1j})_{-1}$, $f_{1(j+1)}(x_{1(j+1)})$, are the $i^{th}$ and $j^{th}$ breakpoints of the driver's demanded torque, $T_q$, in the table before the update and variables $f_{2j}(x_{2j})_{-1}$, $f_{2(j+1)}(x_{2(j+1)})_{-1}$ are the $i^{th}$ and $j^{th}$ breakpoints of the transmission oil temperature, $T_O$, in the table before the update.

—where—

$\delta L_1$=Lower breakpoint increment/decrement in the first row=$w_1 \cdot \delta$Low $\delta H_1$=Higher breakpoint increment/decrement in the first row=$w_2 \cdot \delta$High $\delta L_2$=Lower breakpoint increment/decrement in the second row=$w_2 \cdot \delta$Low $\delta H_2$=Higher breakpoint increment/decrement in the second row=$w_2 \cdot \delta$High —where—

$$\delta High = \begin{cases} \Delta_{DC}, \text{ with } x_{1k} \leq x_{11} \\ \Delta_{DC}\left(\frac{x_{1(j+1)} - x_{1k}}{x_{1(j+1)} - x_{1j}}\right), \text{ with } x_{1j} \leq x_{1k} \leq x_{1(j+1)} \\ 0, \text{ with } x_{1k} \geq x_{18} \end{cases} \quad (30)$$

$\delta$Low=$\Delta_{DC}$−$\delta$High $\Delta_{DC}$=Maximum underdrive assembly learning increment/decrement $x_{1k}$=Driver's demanded torque at start of shift.

$x_{1j}$=Driver's demanded torque at the lower breakpoint.

$x_{1(j+1)}$=Driver's demanded torque at the higher breakpoint.

$x_{11}$=$1^{st}$ breakpoint of the driver's demanded torque.

$x_{18}$=Last breakpoint of the driver's demanded torque.

The computation of a surface point in the three-dimensional lookup table given by Equation 28 and the learning algorithm discussed above, are used in the double-swap shift (i.e., the 2-3 shift, for example). As can be seen from the results, the following observations are made.

The full release of the underdrive assembly releasing clutch occurs when the main box 13 begins to slip. Because the input torque of the underdrive assembly 15 will be increasing drastically at this point the controller 36 releases the clutch so that shift will occur in the next thirty to seventy milliseconds to assist the underdrive assembly 15 in beginning its shift, as shown in FIG. 10.

The underdrive assembly hold pressure controls the underdrive assembly release clutch speed change. By softly reapplying the release clutch, the underdrive assembly release pressure is held constant until the underdrive assembly speed change is completed.

Using a new surface lookup table to learn the initial underdrive clutch torque capacity, during a double-swap shift such as the 2-3 shift, provides consistent shift quality. The surface lookup table (either as defined in Table 1 or as defined in Equation 26) to learn the initial underdrive clutch torque capacity during the double-swap shift, provides consistent shift quality and allows the controller 36 to adaptively control the transmission 10. The above-described technique determines the clutch box/underdrive assembly system dynamics to control precise shift events. The accuracy of the surface adaptation process provides stability and convergence and, thus, shift-consistency.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transmission for a vehicle comprising:
a first gear set including a first plurality of gears;
a second gear set including a second plurality of gears;
a first plurality of elements operable in an applied state to selectively engage selected ones of said first plurality of gears and operable in a released state to selectively disengage selected ones of said first plurality of gears;
a second plurality of elements operable in an applied state to selectively engage selected ones of said second plurality of gears and operable in a released state to selectively disengage selected ones of said second plurality of gears; and
a controller in communication with said first plurality of elements and said second plurality of elements and operable to toggle said first plurality of elements between said applied state and said released state and operable to toggle said second plurality of elements between said applied state and said released state to provide the transmission with a desired gear ratio, said controller timing entry of at least one of said first plurality of elements and said second plurality of elements into said released state with entry of at least another of said first plurality of elements and said second plurality of elements into said applied state by controlling a hold pressure applied to said at least one element entering said released state, said controller determining said hold pressure by referencing current operating conditions of the transmission in a lookup table stored in a memory of said controller.

2. The transmission of claim 1, wherein said current operating conditions include at least one of oil temperature, input torque, engine torque, and battery charge.

3. The transmission of claim 1, wherein said lookup table is a surface lookup table and said current operating conditions include oil temperature and input torque.

4. The transmission of claim 3, wherein said table is an nth-order lookup table containing n operating condition inputs.

5. The transmission of claim 1, wherein said controller adaptively determines said hold pressure to maintain release of said at least one element entering said released state while said at least one element is entering said applied state within a predetermined window of time.

6. The transmission of claim 5, wherein said predetermined window of time is substantially forty to seventy milliseconds.

7. The transmission of claim 1, wherein said controller applies a weighting factor to the location of said current operating conditions within said lookup table to determine said hold pressure.

8. The transmission of claim 1, further comprising at least one solenoid disposed between said controller and said first plurality of engagement elements and between said controller and said second plurality of engagement elements.

9. The transmission of claim 8, wherein said hold pressure is achieved by controlling a duty cycle of said at least one solenoid.

10. A transmission for a vehicle comprising:
a first gear set including a first plurality of gears;
a second gear set including a second plurality of gears;
a first plurality of elements operable in an applied state to selectively engage selected ones of said first plurality of gears and operable in a released state to selectively disengage selected ones of said first plurality of gears;
a second plurality of elements operable in an applied state to selectively engage selected ones of said second plurality of gears and operable in a released state to selectively disengage selected ones of said second plurality of gears; and
a controller in communication with said first plurality of elements and said second plurality of elements and operable to toggle said first plurality of elements between said applied state and said released state and operable to toggle said second plurality of elements between said applied state and said released state to provide the transmission with a desired gear ratio, said controller timing entry of at least one of said first plurality of elements and said second plurality of elements into said released state with entry of at least another of said first plurality of elements and said second plurality of elements into said applied state by adaptively regulating a hold pressure applied to said at least one element entering said released state based on previous shift events.

11. The transmission of claim 10, wherein said controller determines said hold pressure by referencing current operating conditions of the transmission in a lookup table stored in a memory of said controller.

12. The transmission of claim 11, wherein said current operating conditions include at least one of oil temperature, input torque, engine torque, and battery charge.

13. The transmission of claim 11, wherein said lookup table is a surface lookup table and said current operating conditions include oil temperature and input torque.

14. The transmission of claim 13, wherein said table is an nth-order lookup table containing n operating condition 17.

15. The transmission of claim 11, wherein said controller applies a weighting factor to the location of said current operating conditions within said lookup table to determine said hold pressure.

16. The transmission of claim 10, wherein said controller determines said hold pressure to maintain release of said at least one element entering said released state while said at least one element is entering said applied state within a predetermined window of time.

17. The transmission of claim 16, wherein said predetermined window of time is substantially forty to seventy milliseconds.

18. The transmission of claim 10, further comprising at least one solenoid disposed between said controller and said first plurality of engagement elements and between said controller and said second plurality of engagement elements.

19. The transmission of claim 18, wherein said hold pressure is achieved by controlling a duty cycle of said at least one solenoid.

* * * * *